United States Patent [19]
Goeckler et al.

[11] Patent Number: 6,026,128
[45] Date of Patent: Feb. 15, 2000

[54] FREQUENCY- AND PHASE REGULATOR DEVICE FOR VSB RECEIVERS

[75] Inventors: Heinz Goeckler; Thomas Alberty, both of Backnang, Germany

[73] Assignee: Robert Bosch GmbH, Stuttgart, Germany

[21] Appl. No.: 08/981,365

[22] PCT Filed: May 22, 1996

[86] PCT No.: PCT/DE96/00888

§ 371 Date: Dec. 18, 1997

§ 102(e) Date: Dec. 18, 1997

[87] PCT Pub. No.: WO97/01234

PCT Pub. Date: Jan. 8, 1997

[30] Foreign Application Priority Data

Jun. 20, 1995 [DE] Germany ............... 195 22 231

[51] Int. Cl.[7] .................................................. H04N 5/21
[52] U.S. Cl. .................. 375/321; 375/326; 375/327; 375/344; 375/350; 348/536; 348/607; 348/735
[58] Field of Search .............................. 375/321, 326, 375/327, 344, 350; 348/536, 607, 726, 736

[56] References Cited

U.S. PATENT DOCUMENTS

| | | | |
|---|---|---|---|
| 5,663,773 | 9/1997 | Goeckler | 348/726 |
| 5,825,833 | 10/1998 | Sakaue | 375/344 |

FOREIGN PATENT DOCUMENTS

| | | |
|---|---|---|
| 0 583 643 | 2/1994 | European Pat. Off. . |
| 44 17 724 | 11/1995 | Germany . |

OTHER PUBLICATIONS

T. Alberty et al., "A New Patter Jitter Free Frequency Error Detector", *IEEE Transanctions On Communications*, Feb. 19 vol. 37, No. 2, pp. 159–163.

*Primary Examiner*—Amanda T. Le
*Attorney, Agent, or Firm*—Kenyon & Kenyon

[57] ABSTRACT

A frequency and phase regulating circuit, particularly for a digital complex-value vestigial sideband signal or Nyquist flank-filtered signal, with a regulating loop having a filter device which generates, from the signal to be regulated, a symmetrical double sideband signal band-delimited to a reference frequency. This regulating circuit is particularly suitable for a digital TV demodulator.

17 Claims, 11 Drawing Sheets

FREQUENCY- AND PHASE REGULATOR DEVICE FOR VSB RECEIVERS

FIELD OF THE INVENTION

The present invention relates to a frequency and phase regulating circuit, particularly for a digital complex-value vestigial sideband signal or Nyquist flank-filtered signal.

BACKGROUND INFORMATION

In order to achieve a fixed-frequency and fixed-phase control system, it is described in IEEE Transactions on Communications, Vol. 37, No. 2, 1989, pages 159 to 163 to provide an additional AFC loop in addition to the narrow-band PLL loop. A quadricorrelator is suitable as a frequency error detector for the processing of digital signals.

A common frequency and phase regulation device, in which decimation occurs before the loop filter of the AFC loop and interpolation occurs afterward, is described in EP 583 643 A1. A quadricorrelator is also used therein as the frequency error detector.

SUMMARY OF THE INVENTION

The frequency and phase regulating circuit according to the present invention yields synchronization that is correct in frequency and phase, particularly for a digital complex-value vestigial sideband signal or a Nyquist flank-filtered signal.

The usual television signal (FBAS$_{TT}$ signal in modulated form) is a DSB (double sideband) signal with carrier, the lower sideband below $f_{pc}$ (picture carrier) minus 0.5 MHz being cut off and filtered out by means of a bandpass filter (anputated DSB signal, or ADSB). To demodulate a signal of this kind, mixing must occur in a frequency-correct and fixed-phase fashion in order to recover the modulated signal correctly.

The regulating circuit according to the invention ensures frequency slaving in a sufficient lock-in range. AFC thus and PLL jitter can be effectively suppressed.

DETAILED DESCRIPTION

The present invention is explained for the frequency and phase regulation of a digitized complex TV signal. However, those skilled in the art will understand that this is for exemplary purposes only and should not be interpreted as a limitation.

Figure 1:
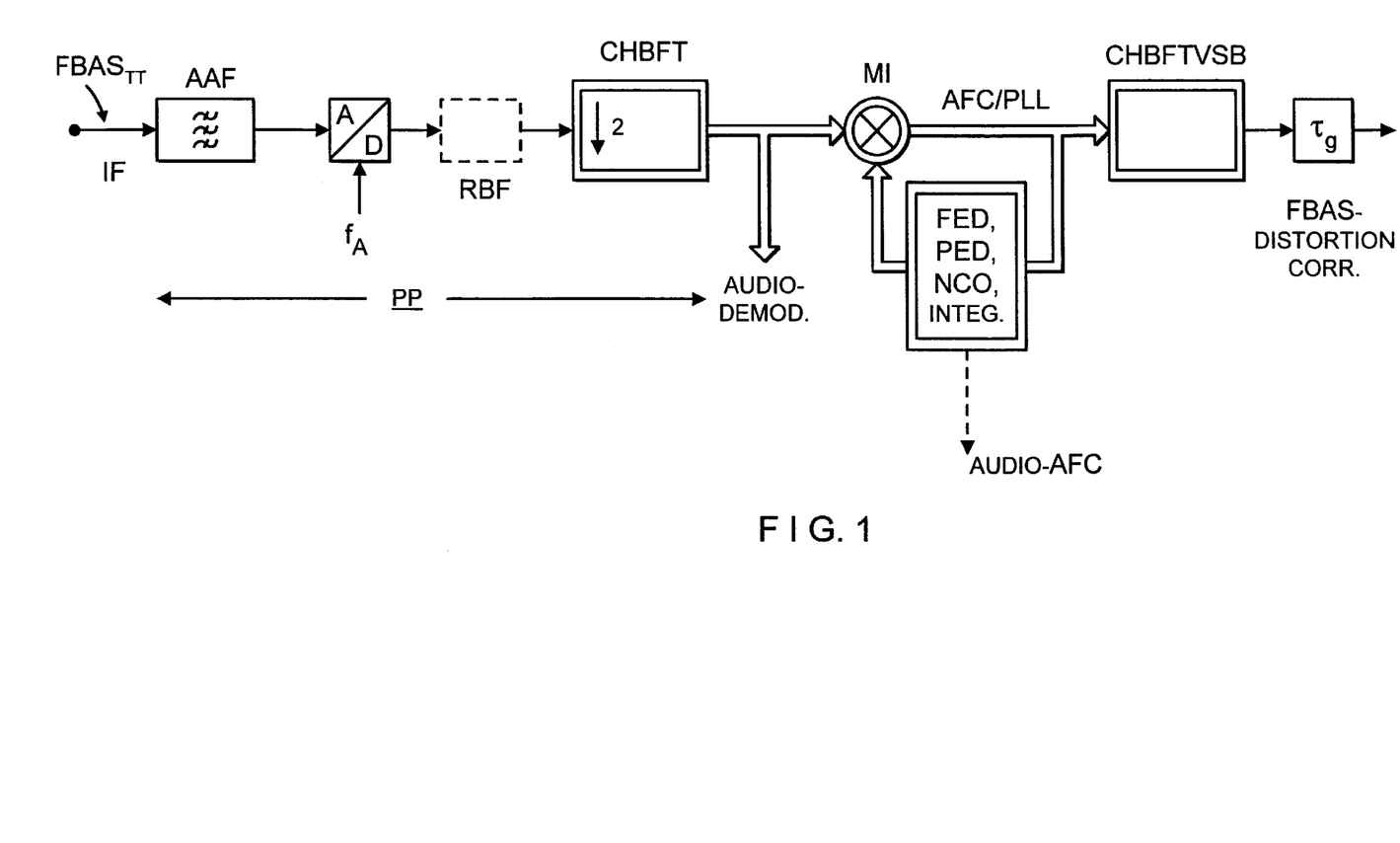
FIG. 1 shows a block diagram of a TV demodulator having a regulating circuit according to the present invention.

FIG. 1 shows a block diagram of a TV demodulator (without the audio portion), with a fixed-phase AFC/PLL frequency regulating system. The input-side FBAS$_{TT}$ signal in the IF position is conveyed to a preprocessing stage PP where it is prefiltered (anti-aliasing filter AAF), sampled (A/D) at a sampling frequency $f_S$ of, for example, 28.2763 MHz, optionally fed through a band filter RBF with real coefficients, and conveyed to a complex filter (vestigial sideband filter) CHBFT. The complex filter is preferably embodied as an L-band filter, with a decimation factor of, for example, L=2 (half-band filter). Further details of this processing may be found in German patent applications P 43 37 134 and P 44 17 724, and in German Patent 36 21 737. The complex-value TV signal preprocessed in this fashion is conveyed for demodulation through a complex Nyquist filter, such that the symmetry point must lie exactly at the carrier frequency ($f_{NYQ}=f_{PC}$). A mixer MI is used to effect a frequency shift of $-f_{PC}$ (picture carrier frequency) to f=0. In the concept depicted in FIG. 1, this sequence is not followed, since only the complex-value envelopes are considered (equivalent base band depiction); i.e. first a mixing by $-f_{PC}$ to f=0 takes place, and then a complex Nyquist filtering operation (CHBFTVSB) with $f_{NYQ}$ =0, which can be achieved more efficiently (last demodulator step: formation of real component).

In the region of interest, the ADSB signal is passed through a filter with the following quantitative frequency response:

$$|H(e^{j\Omega})| = 1 - \begin{array}{l} \Delta H(e^{j\Omega})\Omega > 0, \\ \Delta H(e^{j\Omega})\Omega < 0 \end{array}$$

After Nyquist filtering, the ADSB signal corresponds to an ESB signal with deviations therefrom around the carrier frequency with added carrier. The following applies:

$$\underline{s}_{RSB}^{(k)} = a_0[1 + m(v(k) \pm jv(k))] \cdot e^{j(2\pi k f_0 T + \varphi_0)}$$

It is evident from this that mixing must occur in correct-frequency ($-f_0$) and fixed-phase ($-\varphi_0$) fashion to ensure correct recovery of the modulating signal $$a_0(1+mv(k))=R_e\{^sVSB(k)\}$$

by forming the real component of the complex envelope.

The regulating circuit according to the present invention (for example as part of a TV demodulator) must meet the following requirements:
 a) Correct synchronization in both frequency and phase (AFC-PLL);
 b) AFC locking range: ±140 kHz.

Initial synchronization, or readjustment when frequency or phase jumps occur, should not take more than approximately one second.

Figure 2:
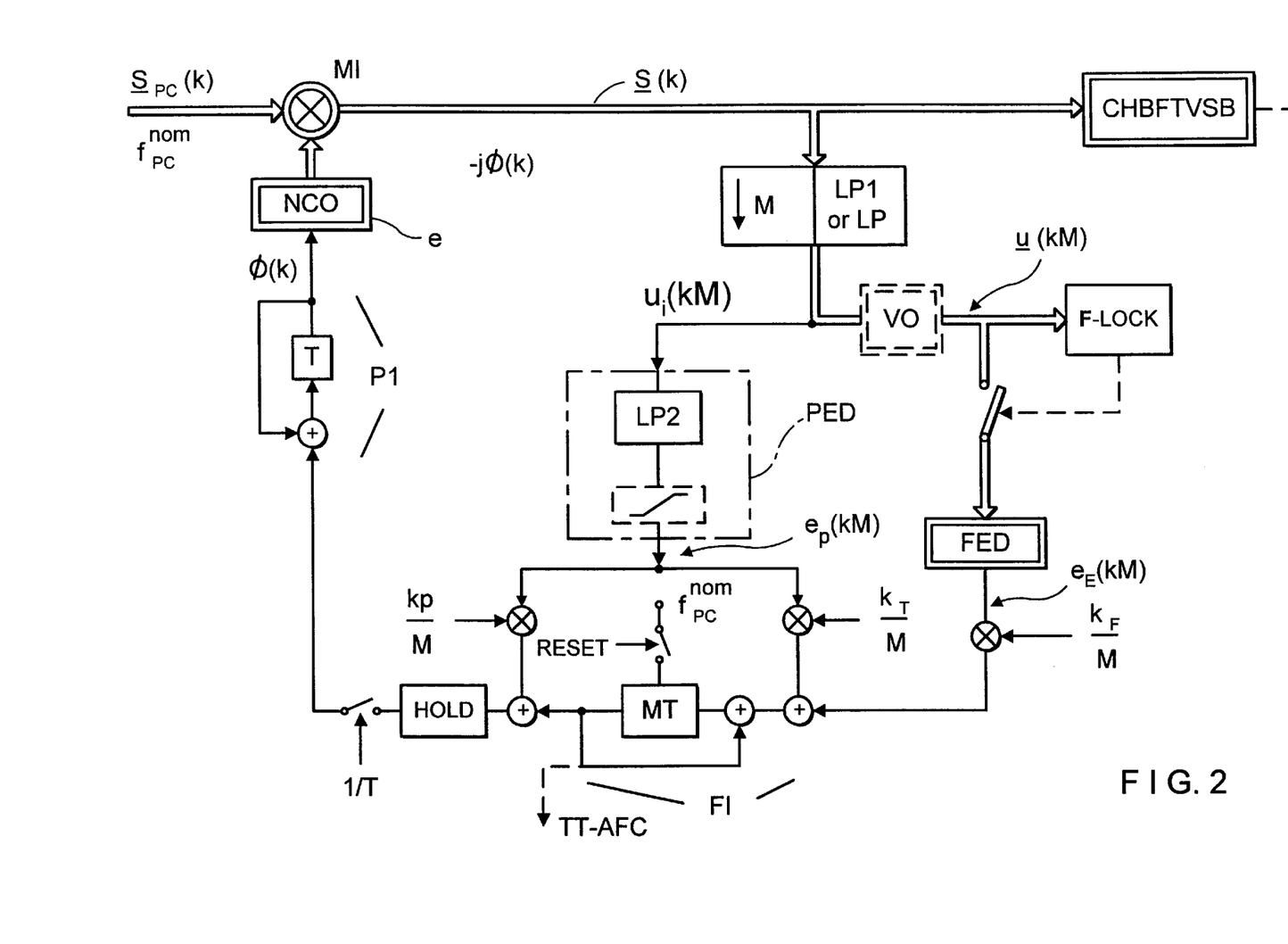
FIG. 2 shows a block diagram for an embodiment of a regulating circuit according to the present invention.

A preferred embodiment of a regulating circuit according to the present invention as shown in FIG. 2 is first described for the case in which the carriered picture signal $S_{PC}(k)$ is an ADSB signal.

Block PF is thus omitted. At the beginning, a reset sets the AFC to the nominal picture carrier frequency $f_{PC}^{nom}$=3.5145 MHz, around which the actual picture carrier frequency $f_{PC}$ can fluctuate by up to ±140 kHz.

The mixed picture carrier frequency of s(kT)=s(k), where $$T = 1f_S = \frac{1}{14,13818 \text{ MHz}}$$

is thus located at f=0±140 kHz, i.e. in the vicinity of the desired value f=0. In the region $f_{pc}$±500 kHz (±500 kHz at s(k)), the spectrum [S] with respect to $f_{pc}$ is Hermitian (magnitude is an even function of frequency, phase an odd function), since this component is identical to the original unamputated FBAS DSB signal.

In order to convert the ADSB signal for frequency and phase regulation into a DSB signal, the control signal is band-delimited by a low-pass filter LP (averaging).

In order to minimize jitter of the NCO signal $e^{-j\Phi(k)}$, a narrow loop bandwidth $B_L$ should be selected. A second-order PLL (PED branch) converges even at any frequency error. For low values of $B_L$, this can in some circumstances take minutes to hours. But because, for the reasons stated, a low-pass LP is provided in the loop, a higher-order loop is actually present, for which an initial synchronization cannot be guaranteed. For this latter reason, increasing the loop bandwidth $B_L$ during the startup phase ($k_I$ and $k_D$ parameter changeover) also does not constitute a solution which guarantees convergence, since once $B_L > /\approx f_S/100$, the loop delay resulting from the low-pass LP has an increasingly troublesome effect. In order to guarantee startup and provide it within an acceptable time period, an additional frequency regulation loop (FED) is provided, ensuring frequency slaving for the possible frequency error of±140 kHz.

A low-pass filter LP in the regulating circuit is capable of generating, from the ADSB signal, a band-delimited ASB signal that is symmetrical with respect to a reference frequency. This low-pass is also intended to exhibit only negligible attenuation of the picture carrier PC even at the maximum frequency error (±140 kHz). Low-pass filter LP is intended to be symmetrical with respect to the intended frequency (reference frequency f=0), i.e. to have real coefficients. Low-pass filter LP is preferably configured in decimating fashion, which reduces both the linkage complexity of this low-pass filter and the calculation outlay for the subsequent units of the loop. The decimation factor is to be selected so that preferably the following conditions apply:
 $f_S$/M> locking range (140 kHz), where M=number of sampled values;

Loop bandwidth $$B_L < / \approx \frac{(f_S/M)}{100},$$

so that the loop delay introduced by the low-pass filter does not have a deleterious effect;
 Loop bandwidth $B_L \approx \Delta\omega_L$=lock-in range of a PLL. Selecting M=32 yields:

$$f_S/M=441.81 \text{ kHz}>140 \text{ kHz, and } B_L \approx \omega_n \leq 4 \text{ kHz}.$$

Figure 3:
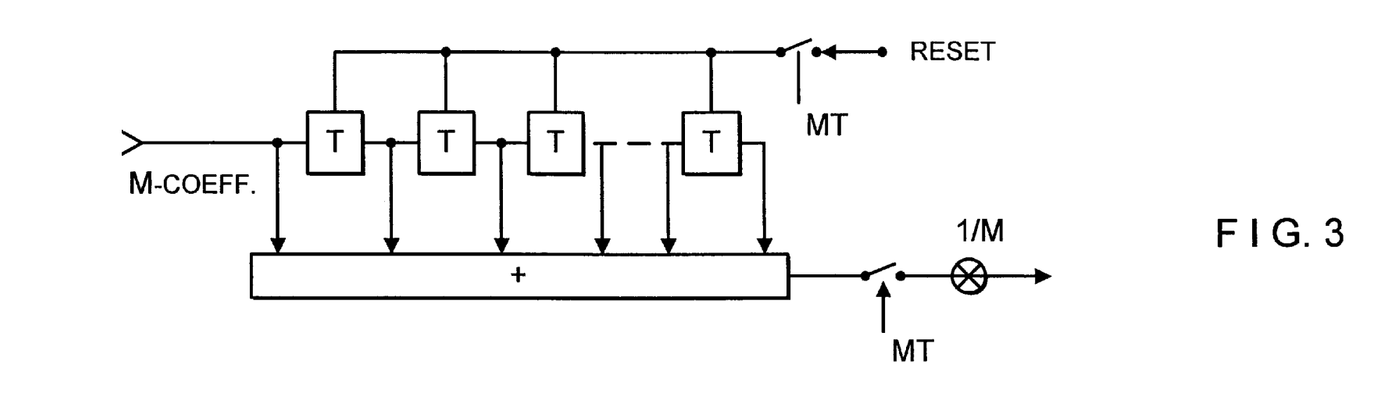
FIG. 3 shows the structure of a low-pass filter to generate a symmetrical double sideband signal.

Low-pass filter LP can thus be implemented very easily by summing M successive sampled values (with 1/M scaling) with recycling and reset every M sampled values as shown in (FIG. 3). The equation governing the transfer function of the low-pass filter as shown in FIG. 3 is:

$$|H_{TP}(e^{j\Omega})| = \frac{1}{M} \frac{\sin M\pi f/f_S}{\sin \pi f/f_S}$$

Low-pass filter LP has zero points (attenuation peaks) at $m \cdot f_S/M$, m=1, 2, . . . , M−1.

Since low-pass filter LP still generates relatively high levels of aliasing, one embodiment of the present invention allows frequency regulation only during the blanking intervals (porches), in order to be entirely independent of the particular FBAS modulation.

For the effective range (bandwidth) of the AFC (±140 kHz), the low-pass filter LP is regarded as transparent, i.e, attenuation $a_s$ (±140 kHz)≈1.5 dB.

The frequency lock indicator F-lock is initially assumed to be optional. If the AFC causes a tendency to jitter, or causes a vestigial frequency error, the AFC control loop is to be shut down by the lock-in signal.

Figure 4:
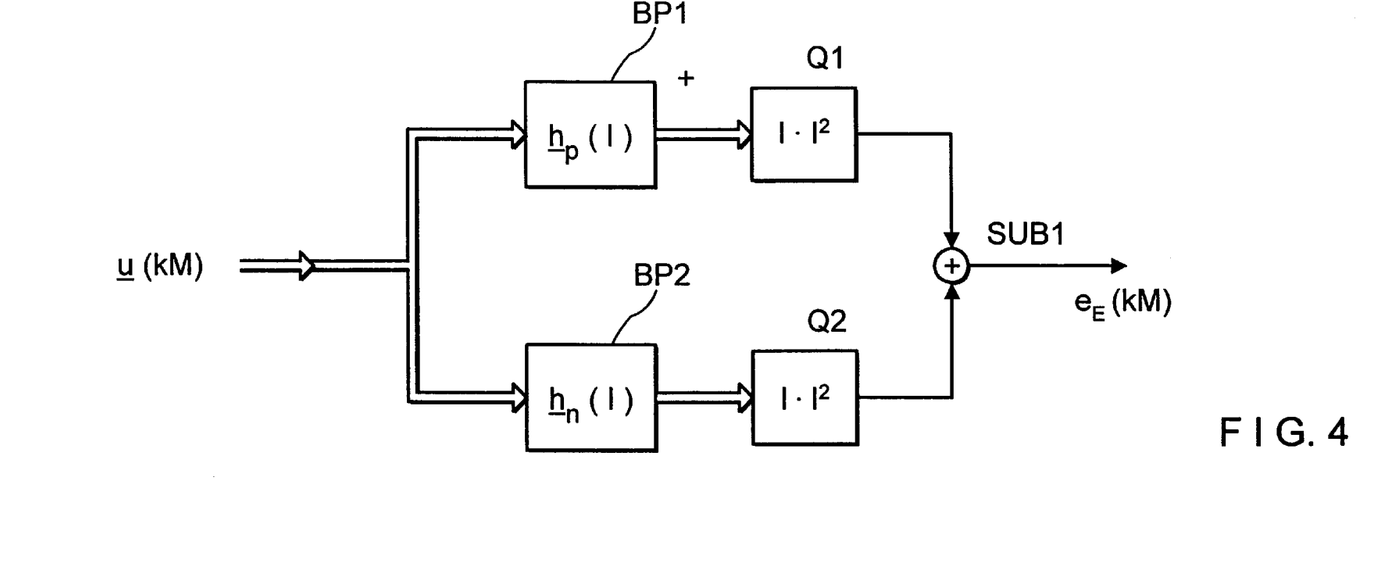
FIG. 4 shows the configuration of the frequency error detector.
Figure 5:
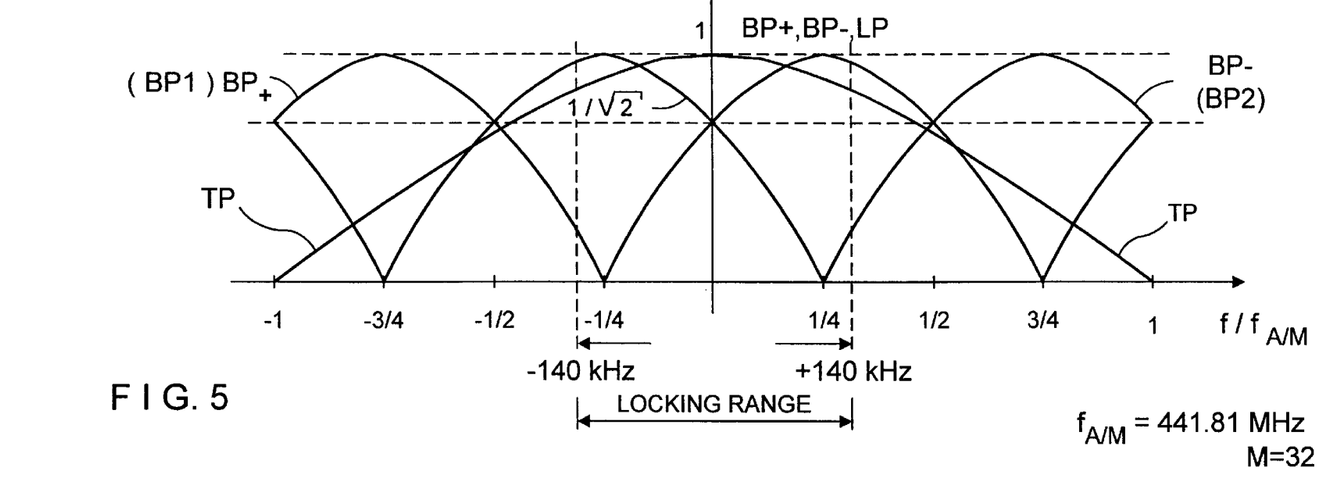
FIG. 5 shows the spectrum components of the frequency error detector.
Figure 6:
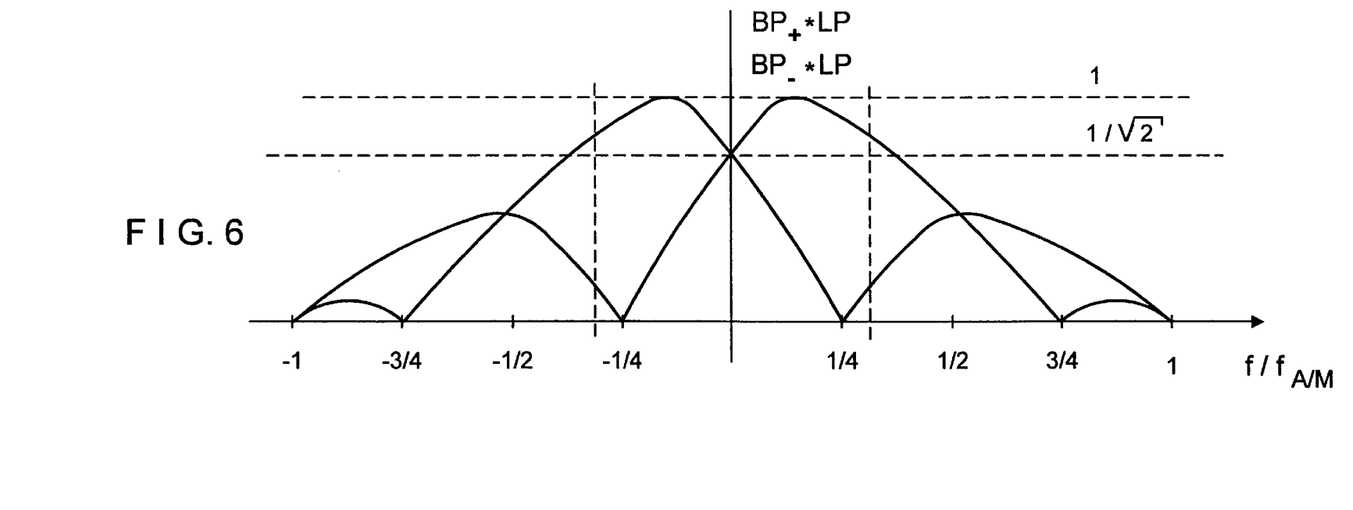
FIG. 6 shows further spectrum components of the frequency error detector.

The configuration and manner of operation of the frequency error detector (FED) are depicted in FIGS. 4 to 6. The low-pass-filtered, decimated, complex-value signal u(kM)=$u_r$(kM)+j$u_i$(kM, is fed to two bandpass filters BP1 and BP2 with complex coefficients, both of which are derived from the same prototype filter by a frequency shift of ±¼·$f_S$/M=±¼·$f_S$'(FIG. 4). The difference (SUB1) between its outputs (squaring elements Q1, Q2) yields the error variable or control variable $e_E$(kM). The two frequency responses are depicted in FIG. 5 for the prototype filter H(z)=1+$z^{-1}$. Depending on where the carrier lies in the locking range, the dominating output component in the low-pass-filtered ADSB signal is $$e_E(kM) \gtrless 0,$$

and the frequency is thus locked in. Note that for the spectrum components of s(k) before low-pass filtering, the cascade of frequency responses of LP and BP1 or BP2 is effective (FIG. 6). For the spectrum components which are folded over or which repeat periodically with the basic period $f_{S'}$=$f_S$/M, however, only the transfer functions of BP1 or BP2 alone are effective (FIG. 5). There thus occurs, for example at $f_S$'/4 and simultaneously at −3$f_S$'/4, a line which doubles the controller output signal of frequency error detector FED. With the equations $$hp(1)=hp(kM)=h_r(1)+jh_i(1)$$

$$h_n(1)=h_n(kM)=h_r(1)+jh_i(1)$$

the following applies to the output signal:

$$e_E(1)=4(h_r*u_i)\cdot(h_i*u_r)-4(h_r*u_r)\cdot(h_i*u_i)$$

Figure 7:
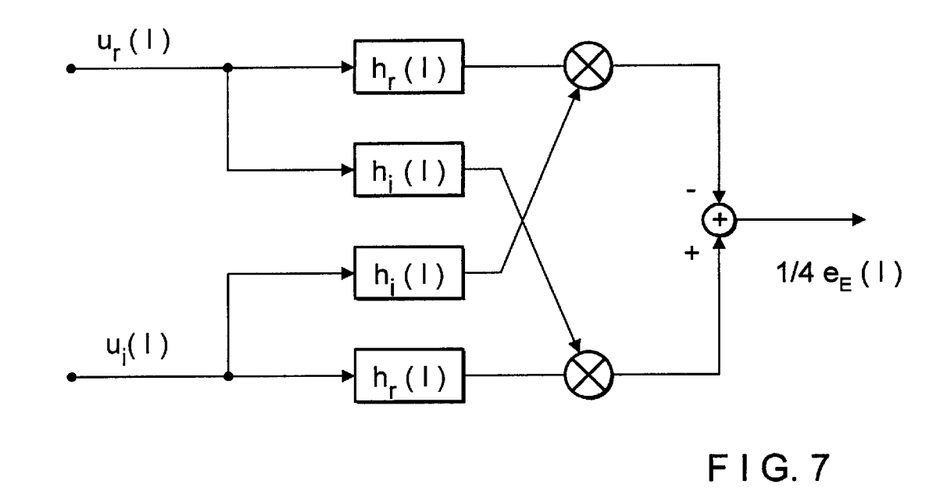
FIG. 7 shows a simplified form of the frequency error detector.

The simplified form of the frequency error detector FED depicted in FIG. 7 therefore results for any transfer functions H(z) of the prototype filter.

If $H(z)=1+z^{-1}$, then, because $1=0,1$:

$$\underline{h}p(1) = h(1)\cdot j^{l+1} \Leftrightarrow \underline{H}+(z) = j - z^{-1}$$

$$\underline{h}_n(1) = h(1)\cdot(-j)^{l+1} \Leftrightarrow \underline{H}(z) = -j - z^{-1}$$

Figure 8:
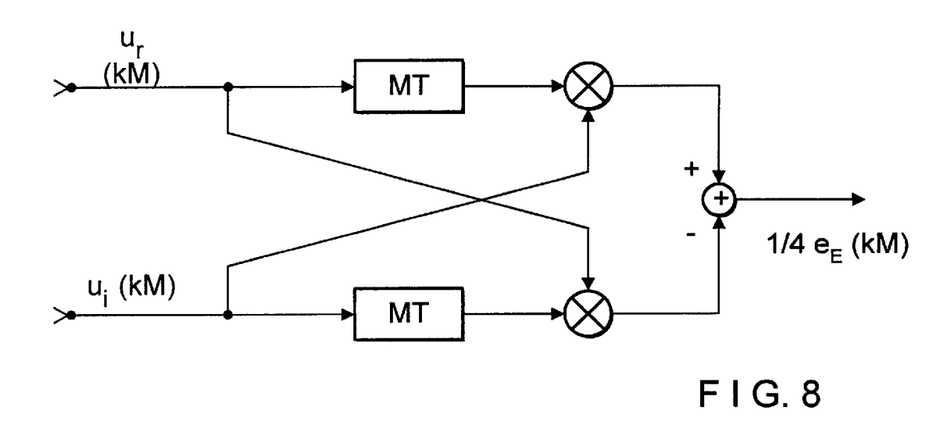
FIG. 8 shows a quadricorrelator as a frequency error detector.

FIG. 8 shows, as the frequency error detector FED, a quadricorrelator for which the following equations apply:

$$h^{+e,cir}{}_r=+ee\ -z^{-1}=\text{delay } MT=T_A'=1/f_S'$$

$$h_i^{+e,cir}=+ee\ 1.$$

The output signal of frequency error detector FED is amplified by the loop gain factor $k_F/m$ and sent to frequency integrator FI, which at the outset is initialized to $f_{PC}{}^{nom}=3.5145$ MHz. As FIG. 2 shows with dashed lines, the mixing frequencies for an audio demodulator can be taken or derived from the FI module. The reference frequency (TT-AFC) for a frequency and/or phase control loop of an audio demodulator may also preferably be obtained in this fashion.

Phase integrator PI is operated at $f_S$. The value of the loop filter (frequency integrator) is therefore fed at time kMT into the phase integrator, M times in succession; this corresponds to an interpolation with the transfer function according to $H_{LP}(e^{j\Omega})$, without the factor 1/M. The sign reversal necessary in the loop is provided in the $e^{-j\Phi(k)}$ block (sine/cosine table).

The PLL control loop is of a conventional configuration; as described, decimation is performed before the loop filter, and further interpolation occurs afterwards. The loop filter is of degree 1, and contains a proportional component ($k_p/N$) and integral component ($k_1/N$). Because $f_S'=f_S/32>\approx 100\ B_L$, the PLL can be treated approximately as a second-order system.

The low-pass filter LP in the control loop generates, from the ADSB signal s(k), approximately the DSB signal:

$$\underline{u}(kM)\approx a_0[1+m\cdot\bar{v}(kM)]\cdot e^{j(2\pi kMf_0T+\phi_0)}.$$

It is evident from this, together with the equations presented previously for the ADSB signal, that both the frequency $f_0$ and the phase $\phi_0$ are to be regulated to zero, as $\bar{v}(k)$, a band-delimited usable signal (real component).

The simplest way of regulating $\phi_0$ to zero is indicated by the equation for u(kM) with the PED (phase error detector) signal $$e_p(kM)=u_i(kM).$$

Alternatively, the following function can also be used in accordance with the prototype of the quadricorrelator:

$$e_p(kM) =u_i[kMT]+u_i[(k-1)MT].$$

Figure 9:
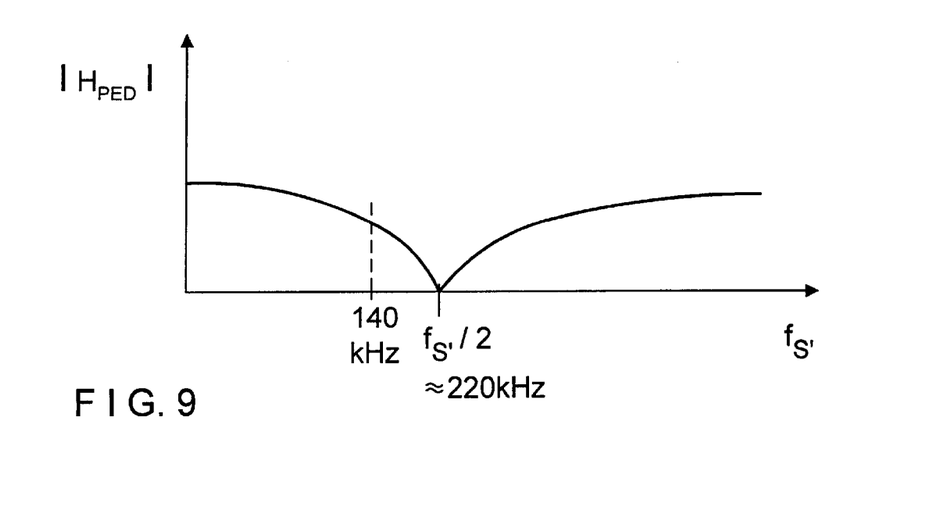
FIG. 9 shows the magnitude of the transfer function $H_{PED}$.

If the phase error detector PED and frequency error detector FED are operating simultaneously, the aforesaid equation for $e_p(kM)$ has the advantage that the FED and PED exhibit the same delay. Based on this last equation, the control slope of the PLL decreases with increasing frequency error as shown (FIG. 9).

For the frequency lock indicator F-lock, the lock-in condition is met if $u_i(kM)$ is always $<u_r(kM)$. The following applies according to the equation for $\underline{u}(kM)$: $\underline{u}(kM)=a_0[1+m\cdot v(kM)]+j\cdot 0 \in R$ has a real value, and $u_r(kM) >0$ for $m<1$. In this case m indicates the degree of modulation.

Figure 10:
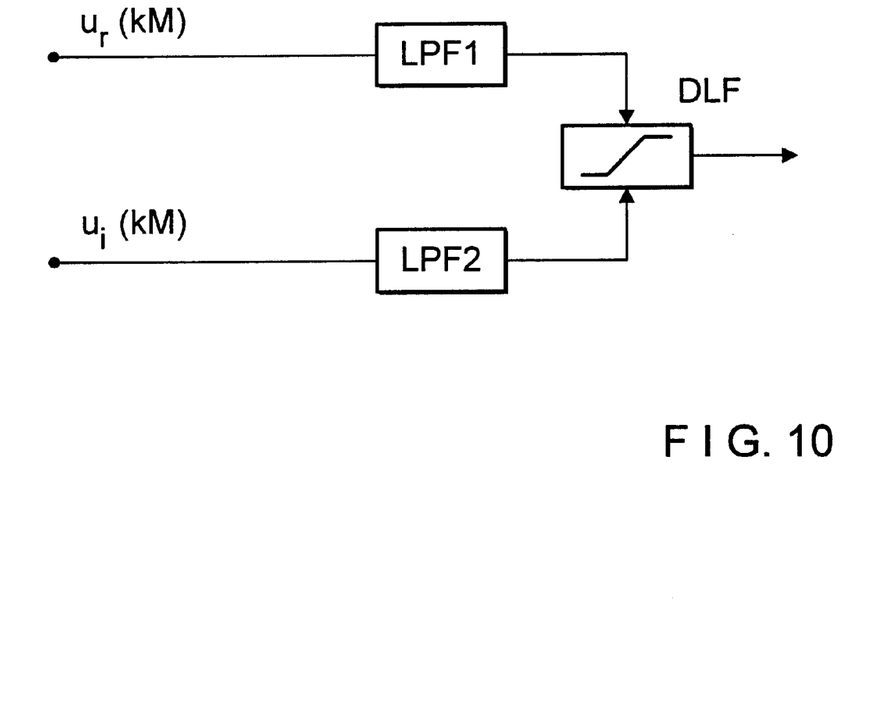
FIG. 10 shows a block diagram for the frequency lock indicator.

FIG. 10 shows a block diagram for the frequency lock indicator F-lock. It consists of two low-passes LPF1 and LPF2, both of which are sent to the delimiter DLF. Delimiter DLF checks whether $|u_i|<|u_r|$ (lock-in). Preferably the frequency lock indicator F-lock is equipped with a hysteresis function which indicates lock-in only if the lock-in condition is met without interruption for a definable period, i.e. for a number of sampled values, and otherwise signals a loss of lock, particularly if the lock-in condition is violated once at any point in time, signals loss of lock.

Prefilter PF (shown with dashed lines in FIG. 1) is provided in the AFC loop to process a VSB signal $S_{PC}(k)$. Prefilter PF must generate, from the spectrum that is centrically symmetrical with respect to $f_{PC}$, one that is axially symmetrical with respect thereto, so that frequency error detector FED can output a correct control signal.

Figure 11:
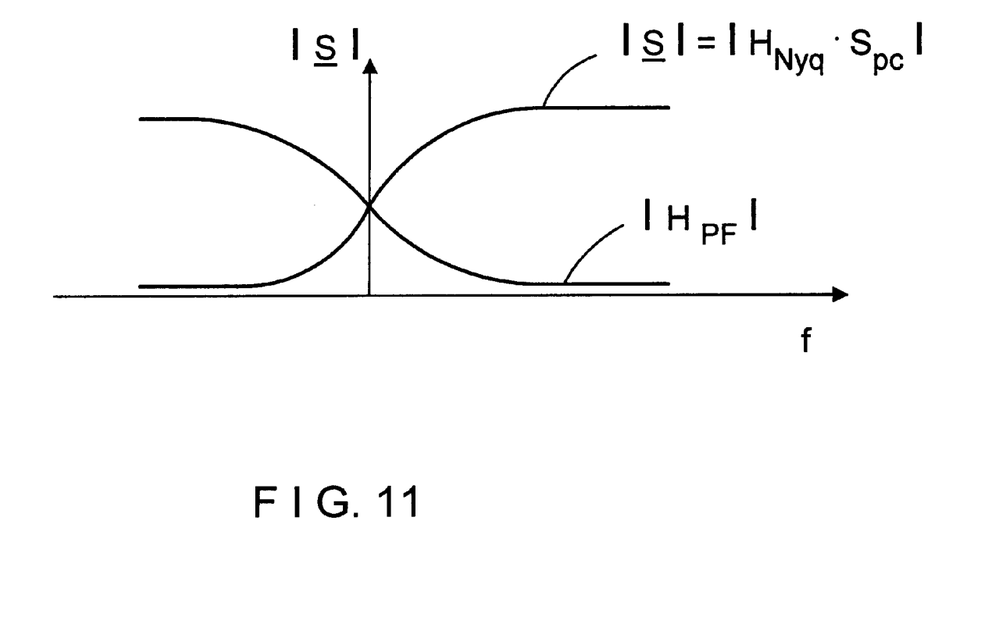
FIG. 11 shows the transfer function of the prefilter and the spectrum of the VSB signal.

If prefilter PF has a Nyquist flank (of the same width) that is opposite to the Nyquist flank of the spectrum of s(k), the spectrum is once again axially symmetrical with respect to $f_{PC}$ after prefiltering if the frequency is correctly regulated. The transfer function of the prefilter $|H_{PF}|$ and the signal spectrum $|S|$ to be processed are depicted in FIG. 11. If the two flanks are not exactly centrically symmetrically to the Nyquist point (f=0, $|H|=\frac{1}{2}$), then $e_E(kM)$ (FIG. 4) for $f_{PC}=0$ is only approximately 0, i.e. a frequency offset occurs in the AFC. If that offset is small enough, the PLL shifts quickly enough into phase lock. In this case once again the AFC is to be shut down upon lock-in.

A simple implementation for prefilter PF (length N=3) can be derived from the prototype filter $H_{prot}=\frac{1}{4}(z^{-1}+1)^2=\frac{1}{4}+\frac{1}{2}z^{-1}=\frac{1}{4}z^{-2}$, by a frequency shift of $-f_{S'}/4$.

The coefficients for N=3 are:

$$h(k) = (-j)^{k-1}h(k)\ \ k = 0, 1, 2$$

$$\Rightarrow h(0) = jh(o)\ \ = j/4$$

$$h(1) = h(1)\ \ = 1/2$$

$$h(2) = -jh(2)\ \ = -j/4$$

Figure 12:
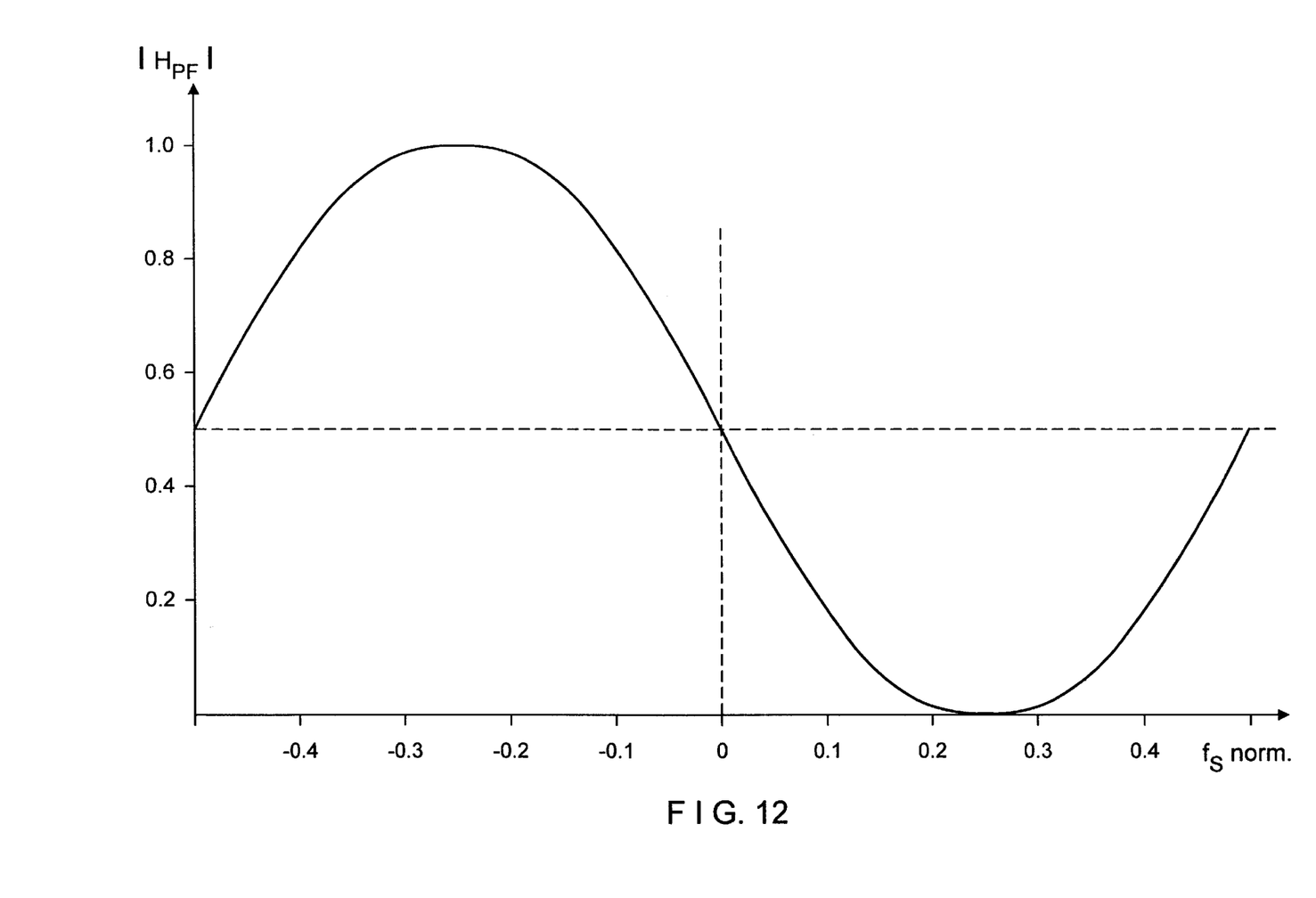
FIG. 12 shows the standardized frequency response of the prefilter for processing of a VSB signal.
Figure 13:
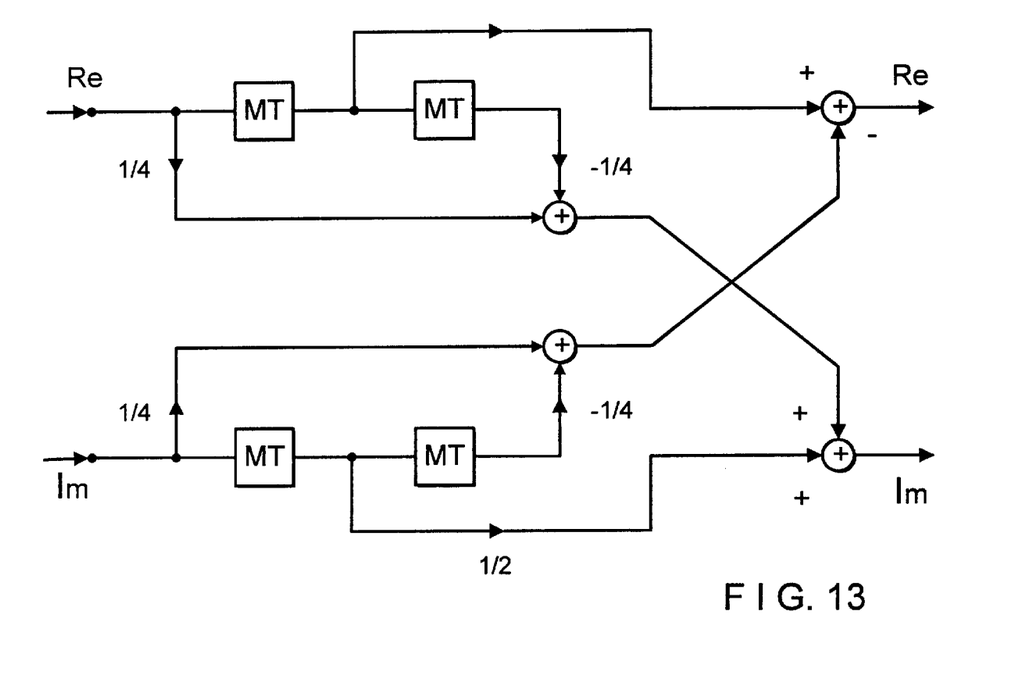
FIG. 13 shows the structure of the prefilter as depicted in FIG. 12.

FIG. 12 shows the standardized frequency response for this. The Nyquist flank extends from $-f_{S'}/4$ to $f_{S'}/4$. The structure of prefilter PF is depicted in FIG. 13. Since the Nyquist flank region is narrower (with $f_{S'}=M=32$) than the desired locking range, in this case M should be selected to be less than 32. In particular, the following should approximately apply:

$$f_s/2=f_{S'}/2M=\Delta B_{Nyq},$$

in other words, the width of the Nyquist flank of the prefilter should be as wide as the flank region of the transmission-side VSB Nyquist filter.

Figure 14:
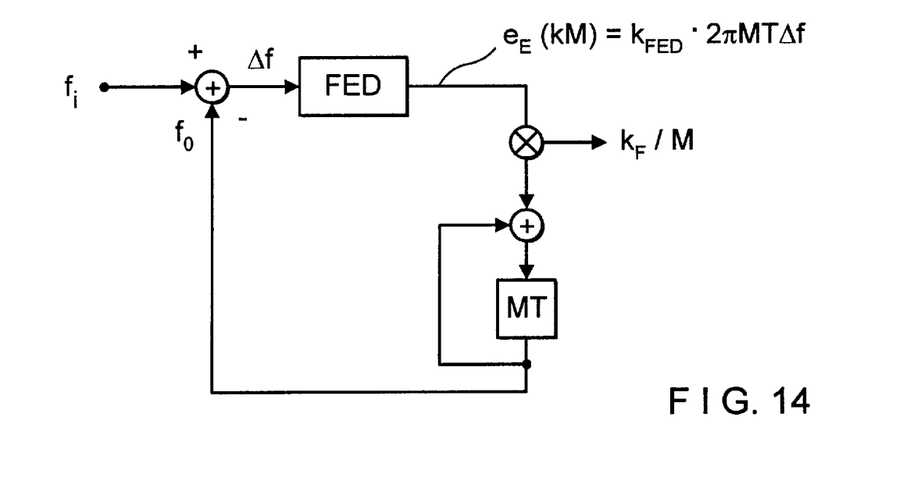
FIG. 14 shows a simplified model of the frequency regulating loop in the time range.

FIG. 14 shows a simplified model of the AFC in the time region (ignoring filter delays and the prefilter).

Figure 15:
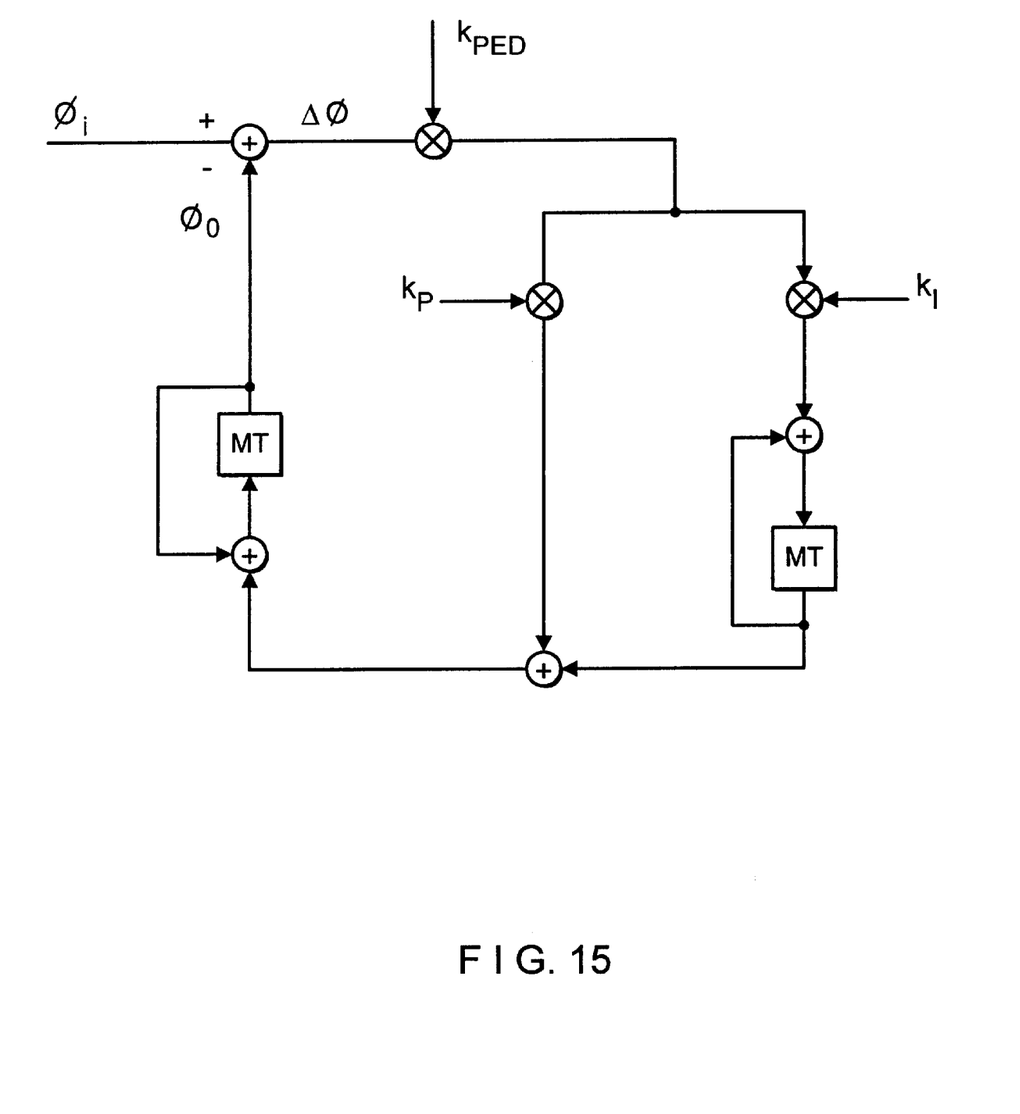
FIG. 15 shows a simplified model of the phase regulating loop, also in the time range.

A simplified model of the PLL (ignoring the additional loop delay due to the LP) is shown in FIG. 15.

The frequency and phase regulating circuit according to the invention is based on the following knowledge:

Fact that the loop filter (low-pass filter LP) for the AFC/PLL must have a sufficiently high blocking attenuation $a_B$. The blocking region boundary must begin, at the latest, where the asymmetry component begins, i.e $f_{PC}\pm 400$ to 700 kHz ($f_{PC}$=0). Since, due to of the real coefficients of the LP, the frequency response in terms of $f_{PC}$=0 is exactly symmetrical, no requirements need to be applied to the profile of the bandpass region. In order to reduce the complexity of the AFC-PLL control loop, the sampling frequency in the low-pass filter LP is reduced. The decimation factor can be selected on the basis of purely practical considerations, since asymmetrical spectrum components are not influenced by the decimation. The bandpass bandwidth is, however, dependent on the decimation factor. The bandpass bandwidth of the decimating low-pass filter LP must be made sufficiently large for the AFC to ensure an adequate lock-in region for the AFC. The bandpass region for the PLL can be made much narrower, since the PLL must engage only at very small frequency errors.

The narrower bandpass bandwidth of the PLL low-pass allows better averaging, thus improving symmetry so that PLL jitter, which is generated by line frequency and modulation, is reduced. The low-pass filter is intended to reduce the spectral asymmetry of the incoming TV signal to a tolerable level. This is done by constraining the ADSB signal approximately back into a DSB signal in the vicinity of the picture carrier. Even if this low-pass filtration could be implemented ideally, there would nevertheless remain a residue of asymmetry in the DSB signal due to the previous signal processing and possibly the transmission channel. By the time it reaches the phase adjustment element/PLL, the TV signal usually passes through several filters which do not have a strictly symmetrical transfer function in the vicinity of $f_{PC}$. The influence of these asymmetries can be diminished by reducing the bandpass bandwidth of the decimating low-pass filter LP for the PLL component. The following criteria are to be applied to the AFC/PLL low-pass filter:

High blocking attenuation to symmetrize the ADSB signal;

Blocking region boundary $f_B$=$f_S$/M $f_S$;

Decimation factor M=32 (64).

No criteria for the frequency response in the bandpass region:

Slow decrease to $f_B$(AFC);

Steep decrease, extended averaging duration, very narrow-band, in order to reduce asymmetries caused by prior filter rippling (PLL).

Based on these criteria, separate low-passes could be provided for AFC and PLL. To eliminate complexity, however, the AFC low-pass filter LP1 is used as a prefilter for the PLL low-pass filter LP2 as shown in (FIG. 2).

For the structure of the PLL low-pass, the PLL low-pass will first be considered in its entirety as a filter, independent of subfilter LP1, and not yet divided into LP1 and LP2.

For a white picture (approximately the worst case), the spectral lines are spaced at the line frequency $f_L$=15.625 kHz. In order to deal with this case optimally, an averaging over N=905, approximately $f_S/f_L$=904.84, would be advisable. The next higher value that can then be used as a base value is $$N=1024 = 2^5 \cdot 2^5$$

which in turn leads to favorable implementations. The first attenuation peak is then located at $f_S/N=f_\infty$=13.80681 kHz, and the additional peaks at integral multiples thereof. Averaging over N=1024 values, with no reduction in sampling rate, means:

$$h_i = \frac{1}{1024} = \frac{1}{n}, \text{ where } i = 1, \ldots N.$$

Let it further be assumed that N=P . Q, such that N, P, and Q are elements from among those natural numbers |N in which at least two whole numbers can be factored. The transfer function has the formula $$H(z) = \frac{1}{N}\sum_{v=1}^{N} Z^{-y}$$

which, if N=P ·Q, can be split into $$H(z) = \frac{1}{N}\left(\sum_{q=1}^{Q} Z^{-q}\right) \cdot \left(\sum_{p=0}^{p-1} Z^{-pQ}\right)$$

Figure 16:
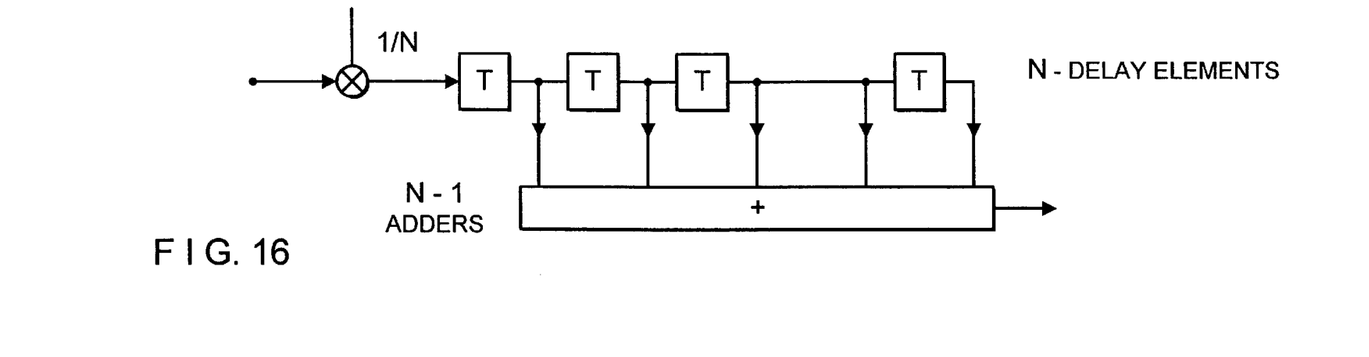
FIG. 16 shows the structure of the PLL low-pass.
Figure 17:
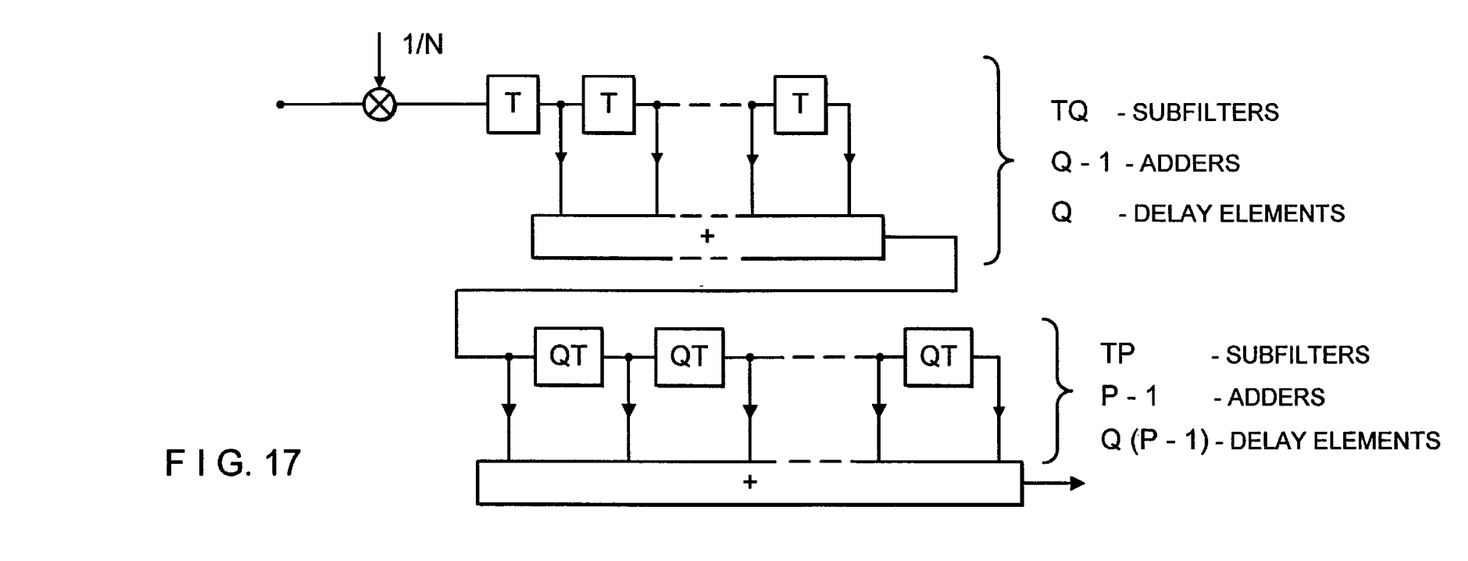
FIG. 17 shows the structure of the PLL low-pass in factored form.

The implementation according to H(z) in the non-factored form requires N-1 adders in a transverse filter block (FIG. 16). In the factored form, (Q-1)+(P-1)=P+Q-2<< N adders are required (FIG. 17), i.e. two transverse filter blocks TQ and TP. Scaling with 1/N can be implemented in the two subfilters TQ and TP as shown in FIG. 17, as 1/Q before the first subfilter and as 1/P before the second subfilter. This yields optimum scaling for the two subfilters TQ and TP.

Further reductions in complexity can be achieved (elimination of additional adders) if P and/or Q can be factored even further:

Q=πQ$_i$, where Q$_i \in$|N

P=πP$_i$, where P$_i \in$|N

In the extreme case, all the subfactors are prime numbers.

The efficient structure as shown in FIG. 17 can also be used to implement highly efficient averaging filters which output the calculated average value with a reduced sampling frequency, the decimation factor M≠N being the averaging factor. If the averaging filter is intended to decimate, then

M=Q is selected.

Figure 18:
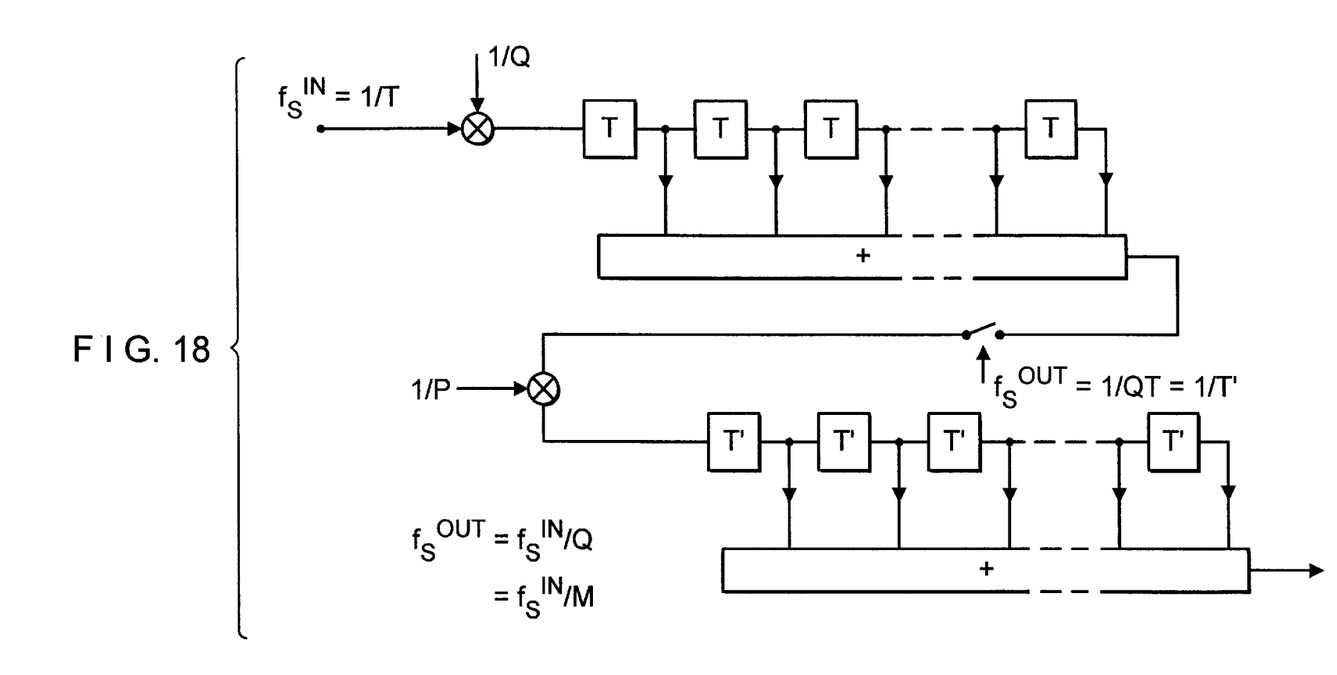
FIG. 18 shows the structure of the PLL low-pass with decimation.
Figure 19:
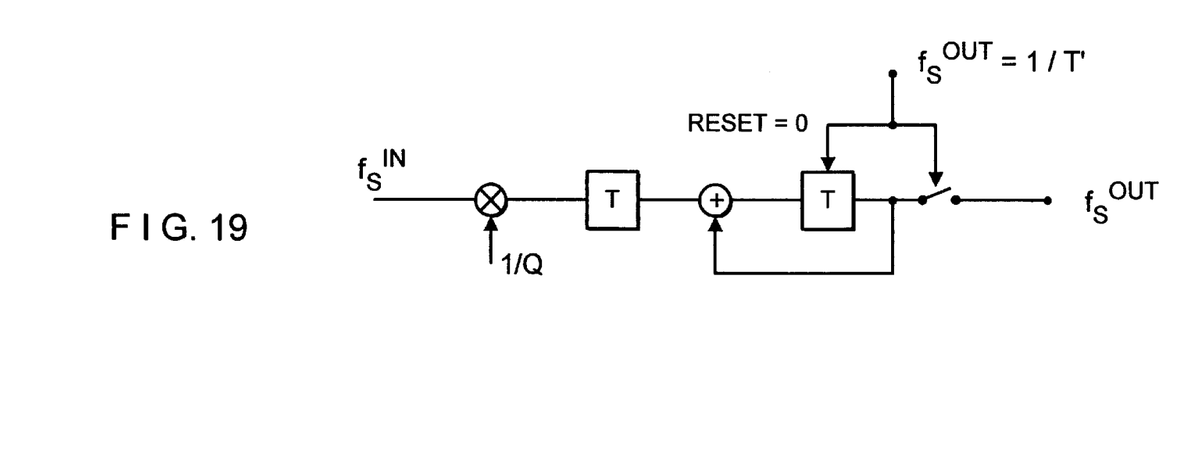
FIG. 19 shows a subfilter of the PLL in a recursive implementation.

In this case shown in (FIG. 18), the TQ filter receives the sample values at an interval T, and forwards a summed value to the LP filter every QT cycles. In other words, the P filter operates entirely at the output sampling frequency $f_S^{OUT}$= 1/(QT)=1/T'. All the delay members QT can therefore be implemented by one delay element as shown in (FIG. 18). As an alternative to FIG. 18, the TQ filter can be implemented, in a manner which is efficient for decimation, in a recursive structure. This TQ averaging filter which decimates by M=Q (averaging over Q values) is depicted in FIG. 19 with only one delay element T in the feedback loop.

Application of knowledge described above to the PLL according to FIG. 2 shows that the split according to FIGS. 17 and 18 corresponds exactly to the cascade of subfilters LP1 and LP2 if LP1 is a Q=32 averaging filter where M=Q=32. Subfilter LP2 then also has P=32 coefficients if the total average duration of the PLL filter is N=P·Q =1024. If it is desirable to increase the PLL averaging time, particularly to reduce jitter, then P can simply be raised. To reduce complexity even further, P=32 could be even further factored. At least one of the decimation factors should preferably be a power of two.

In a further embodiment of the invention, low-pass filter LP2 is followed by a delimiter DL (shown with dashed lines in FIG. 2), the threshold of which is set, especially when the AFC control loop is shut down, to lower values. Because of the narrow bandwidth (long averaging duration) resulting when subfilters LP1 and LP2 are coacting, signal jumps in the PLL loop are already effectively evened out, thus limiting the effectiveness of the delimiter. The principal task of the delimiter is to cap jumps in the loop signal resulting from the picture content, e.g. insufficient loop filtering, so as thereby to reduce modulation-dependent phase jitter. With a suitable definition of the capping threshold, another effect of the delimiter can be that the PLL operates only during synchronization, i.e. in the absence of modulation, and is inactive during the picture content.

We claim:

1. A device for regulating a frequency and a phase of one of a digital complex-value vestigial sideband signal and a Nyquist flank-filtered signal, comprising:

an AFC/PLL regulating loop having an AFC portion and a PLL portion; and a digital low-pass filter device coupled to an input of the AFC/PLL regulating loop, wherein the digital low-pass filter includes delay elements for a summing and a corresponding scaling of successive sampled values of the one of the digital complex-value vestigial sideband signal and the Nyquist flank-filtered signal, wherein the digital low-pass filter device further includes a first subfilter filtering both the AFC portion and the PLL portion of the regulating loop and a downstream second subfilter filtering only the PLL portion of the regulating loop, and wherein the digital low-pass filter device has preselected filter coefficients for causing the one of the digital complex-value vestigial sideband signal and the Nyquist flank-filtered signal to be transformed into a symmetrical double sideband signal that is band-delimited to a reference frequency.

2. The device according to claim 1, wherein the one of the digital complex-value vestigial sideband signal and the Nyquist flank-filtered signal is a digitized TV signal.

3. The device according to claim 1, wherein the one of the digital complex-value vestigial sideband signal and the Nyquist flank-filtered signal is a vestigial sideband signal having a Nyquist flank, and the device further comprising:

a prefilter in the AFC/PLL regulating loop having a frequency response that is an inverse of the Nyquist flank of the vestigial sideband signal.

4. The device according to claim 1, wherein the digital low-pass filter device is configured in a decimating fashion.

5. The device according to claim 4, wherein the digital low-pass filter device has a preselected decimation factor such that a quotient of a sampling frequency for a digitization and a number of sampled values using a transverse filter is greater than a locking range of the PLL portion of the AFC/PLL regulating loop.

6. The device according to claim 4, wherein at least one of the digital low-pass filter device, the first subfilter and the second subfilter has a decimation factor that is a power of two.

7. The device according to claim 1, further comprising:

a frequency lock indicator which separates the AFC portion of the AFC/PLL regulating loop after a frequency is locked in.

8. The device according to claim 7, wherein the frequency lock indicator has a hysterisis function, the frequency lock indicator indicating a lock-in only if a lock-in condition is met without an interruption for a predetermined period with a number of sampled values and indicating a loss of lock if the lock-in condition is violated once at any point in time.

9. The device according to claim 1, wherein the AFC portion of the AFC/PLL regulating loop includes:

a first bandpass filter;

a second bandpass filter; and a subtraction stage determining a difference between an output level of the first bandpass filter and the second bandpass filter, wherein the first bandpass filter and the second bandpass filter are derived from a prototype filter as a function of a frequency shifting.

10. The device according to claim 1, wherein the AFC portion of the AFC/PLL regulating loop includes a quadri-correlator.

11. The device according to claim 1, wherein the first subfilter is configured as a first transverse filter block and the second subfilter is configured as a second transverse filter block, and wherein there is at least one of a scaling before the first transverse filter block and a scaling before both the first and second transverse filter blocks.

12. The device according to claim 1, wherein one of the first subfilter and the second subfilter is configured as a recursive filter having a feedback loop, and wherein the recursive filter includes only one delay element in the feedback loop.

13. The device according to claim 12, wherein the one of the first subfilter and the second subfilter performs decimation and is configured as the recursive filter.

14. The device according to claim 1, further comprising:

a delimiter having a delimiting threshold connected downstream from the second subfilter, the delimiting threshold being predetermined so that the PLL portion of the AFC/PLL regulating loop operates only if a modulated signal is not present.

15. The device according to claim 1, further comprising:

a frequency integrator in the AFC/PLL regulating loop; and an audio demodulator having mixing frequencies.

16. The device according to claim 15, wherein the mixing frequencies are determined as a function of the frequency integrator.

17. The device according to claim 15, wherein the mixing frequencies are used as the reference frequency.

* * * * *